Sept. 8, 1964  S. KOWALSKI  3,147,961
ENCLOSED SPRING CONSTRUCTION
Filed Oct. 27, 1960
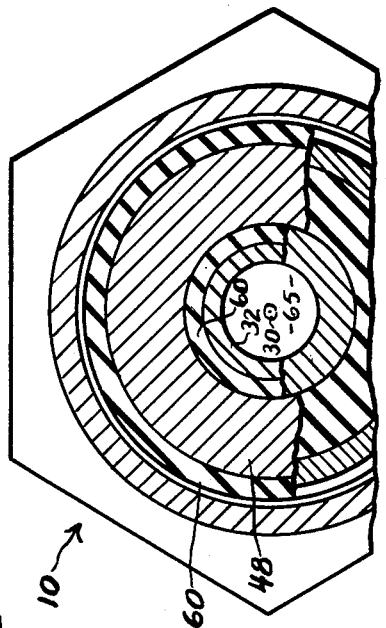
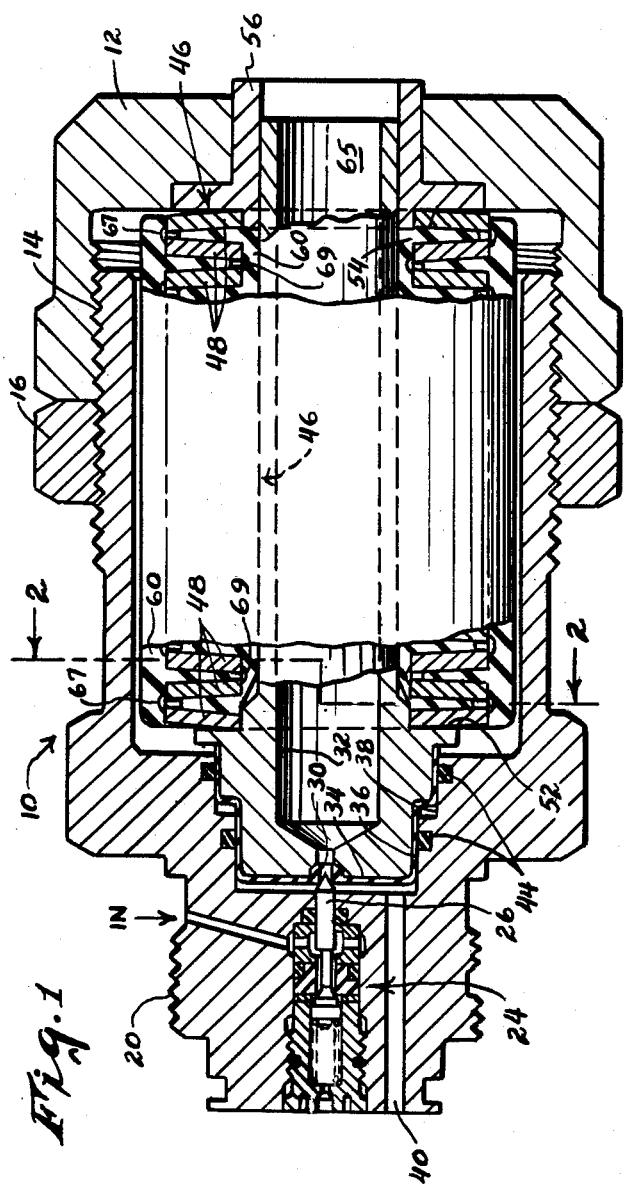
INVENTOR.
Slawomir Kowalski
BY Emery, Whittemore
Sandoe & Graham
ATTORNEYS 3,147,961
ENCLOSED SPRING CONSTRUCTION
Slawomir Kowalski, Rockaway, N.J., assignor to Marotta Valve Corporation, Boonton, N.J., a corporation of New Jersey
Filed Oct. 27, 1960, Ser. No. 65,331
11 Claims. (Cl. 267—1)

This invention relates to springs; and more especially to springs which are encased in resilient and compressible material.

It is an object of the invention to provide an improved construction for an encased spring. It is another object to provide a spring which is permanently encased in foam material, such as foam rubber or plastic foam of non-rigid type, and with the foam of such light density that it does not interfere with the operation of the spring, but will act as an effective thermal insulation around the spring. This insulation permits the spring to be used at locations where it is close to parts that become highly heated for short periods of time, as in the case of exhaust outlets from rockets. Protection of the spring from excessive heating retains the hardness of the spring and prevents change of the spring rate.

Another object of the invention is to provide an improved spring of the dished-washer type. Such springs have stacks of washers with alternating washers dished in opposite directions. It is necessary to provide means for holding the washers in line with one another. With this invention the washers are encased in foam material which maintains their alignment without interfering with the movement of the washers as the spring is compressed and expanded.

Another object of the invention is the effective dampening (energy dissipation) of high dynamic forces on impact that may otherwise overstress the spring, and effective dampening of spring resonance during vibration.

Other objects, features and advantages of the invention will appear or be pointed out as the description proceeds.

In the drawing, forming a part hereof, in which like reference characters indicate corresponding parts in all the views;

FIGURE 1 is a sectional view through apparatus having a spring construction in accordance with this invention; and FIGURE 2 is a transverse sectional view taken on the line 2—2 of FIGURE 1.

The drawing shows a spring housing 10 having an end cap 12 which screws over threads 14 on the housing 10. There is a lock nut 16 for holding the end cap 12 in any adjusted position.

The housing 10 is of reduced diameter at its lefthand end and has threads 20 which screw into a socket of the apparatus on which the housing 10 is to be mounted. Within the reduced diameter portion of the housing 10 there are valve means 24 including a needle valve 26 which extends into an opening 30 in one end of a plunger 32. This plunger 32 has a plastic coating 34 over a portion of its length which slides in a cylinder 36 and a counterbore 38.

The construction and purpose of the valve means 24 and needle valve 26 is of no moment in connection with the present invention. It is sufficient to understand that the plunger 32 is movable axially in the cylinder 36 and counterbore 38 and that the operation of the apparatus requires that this plunger 36 have a bias toward the left in FIGURE 1; that is, that the plunger 36 be subject to a constant spring force urging it toward the left. At times during the operation of the apparatus, the spring force on the plunger 36 is balanced or overbalanced by fluid pressure admitted through a passage 40 into the part of the cylinder 36 beyond the end of the plunger 32. The cylinder 36 and counterbore 38 have O-rings 44 for preventing escape of fluid from the cylinder.

The spring pressure on the plunger 32 is applied by a spring 46 having a plurality of dished washers 48 made of spring material and with alternating washers dished in opposite directions. The washer 48 at the lefthand end of the spring 46 bears against a shoulder 52 on the plunger 32. The washer 48 at the right-hand end of the spring 46 bears against a shoulder 54 of a fitting 56 in the end cap 12.

When the shoulder 52 of the plunger 32 is moved toward the right, the spring 46 is compressed, and the washers 48 flatten to some extent. When the compressing force is removed, or reduced below the force of the spring, the washers 48 return to a more dished condition and the spring expands.

The force exerted by the spring 46 can be adjusted by screwing the end cap 12 further along the threads 14, or by backing the end cap 12 rearwardly along the threads 14; the lock nut 16 being moved as necessary.

The washers 48 are encased in foam 60. This foam may be made of polyvinyl chloride or polyurethane. Foam rubber can also be used, preferably silicone rubber. The construction is preferably made by foaming the material with the washers of the spring in place, that is, in contact with one another and under substantially no compression. The foam should be of light enough density so that it does not interfere with the operation of the spring within the intended limits of spring compression. Since the material is foamed in contact with the washers 48, the foam adheres to the faces of the washers and this holds the washers in their stacked condition. In the preferred construction, however, the foam extends beyond both the outside and the inside circumferences of the washers. This not only provides more strength to the encasement for holding the washers in alignment, but it also provides more effective thermal insulation for the spring. Other foam materials can be used.

There is a passage 65 leading from the passage 30 through the end of the plunger 32. This passage may carry hot fluid, such as hot exhaust gas, and substantial heat may travel through the wall of the plunger 32. By having the foam 60 covering the inside of the spring 46, the metal of the spring is protected from the heat of the fluid in the passage 65. Also, in the case of a high ambient temperature the foam 60 covering the spring 46 on the outside provides the protection of the spring metal from the heat of external atmosphere (supersonic aircraft, missile re-entry capsules, etc.).

In the construction illustrated, there are auxiliary means for holding the spring washers 48 in alignment with one another. These auxiliary means are bands 67 having cross sections of generally T shape with the stem of the T extending between the confronting faces of adjacent spring washers 48, and with the cross bar of the T extending across portions of the circumference of the spring washers. These bands 67 are located around the outer edges of washers which converge toward one another as they extend outwardly. Similar bands 69 are compressed into space between the inner edges of spring washers that converge toward one another as they extend inwardly. These bands 67 and 69 must be made of elastic material because it is necessary for them to expand and contract as the washers flatten and return to dished condition.

Although the invention has been illustrated as applied to a spring made of dished washers, some features of the invention, such as the light density foam insulation, can be applied to other kinds of springs, for example, a helical spring.

The preferred embodiment of the invention has been illustrated and described, but changes and modifications

What is claimed is:

1. An enclosed spring assembly including a cylindrical housing, a piston housing, a piston rod, a fitting in an end wall of the housing and through which the piston rod passes at the end portion of the rod remote from the piston, spring means between the fitting and the piston and urging the piston toward one end of its stroke and away from the fitting, said spring means surrounding the piston rod and extending along a substantial length of the piston rod and spaced from the piston rod along most of the length of the spring means, and thermal insulation foam surrounding the spring means and extending into the space between the spring means and the piston rod, the insulation extending along a length of the piston rod throughout substantially the full length of the spring, and said insulation being restrained against lateral displacement by the piston rod, the spring means being made up of a plurality of dished washers to which the thermal insulation is bonded and by which the washers are held in place with respect to one another.

2. The spring assembly described in claim 1 and in which the foam is continuous between the successive washers and the foam is compressible to less than one fourth of the volume that the foam occupies when the spring means is in its expanded condition.

3. A thermally insulated spring having a plurality of successive substantially annular and axially aligned portions of spring metal, and a foam thermal insulation surrounding the axially aligned portions of the spring and extending continuously between said portions and compressible to a volume less than one fourth of the volume of the foam when the spring is in its expanded condition, the successive axially aligned portions of the spring being dished washers with alternate washers facing in opposite directions and the foam filling the space between washers and extending beyond their radial limits of the washers, and the foam providing at least a part of the structure for holding the washers in alignment with one another.

4. The spring described in claim 3 and in which there are circular bands of resilient material located at the outer circumferential edges of the dished washers, and said washers converge toward one another at their outer edges, and the foam encloses the resilient bands.

5. The spring described in claim 4 and in which there are also bands around the inner edges of the washers and the washers converge toward one another at their inner edges, and the foam also encloses the inner bands.

6. The spring described in claim 3 and in which there are resilient bands around the inner edges of the washers, and the washers converge toward one another at their inner edges, and the foam encloses the bands.

7. An enclosed spring assembly comprising a sliding structure including a piston having an opening therethrough and a hollow piston rod connected to the piston, the rod interior communicating with the opening through the piston, spring means urging the sliding structure toward one end of its stroke and into contact with an element at one end of the stroke of the piston, said spring means surrounding the piston rod throughout the length of the spring means and extending along a substantial length of the piston rod and spaced from the piston rod along most of the length of the spring means, and thermal insulation surrounding the spring means and extending into the space between the spring means and the piston rod for insulating the spring from transfer of heat between the spring and fluid passing through the hollow piston rod.

8. A spring having a plurality of dished washers, successive washers of the spring being dished in opposite directions so that the confronting faces of some washers converge toward the inner edges of the washers and the confronting faces of alternate pairs of washers converge toward their outer edges, circular bands of resilient material located around the edges of the washers, and foam material enclosing the washers and the circular bands and extending between the washers each band being of T-shaped cross section with the stem of the T extending between the washers at their edges which converge most closely together, and the portion of the T at the end of the stem extending across the edges of adjacent washers to hold them in alignment.

9. The spring described in claim 8, and in which the resilient band extends around at least the outside edges of the washers.

10. The spring described in claim 8, and in which the resilient band extends around at least the inside edges of the washers.

11. The spring described in claim 8, and in which the resilient bands extends around both the outside and inside edges of the washers.

References Cited in the file of this patent

UNITED STATES PATENTS

| 1,779,503 | Swindin | Sept. 28, 1930 |
| 2,162,719 | Hay | June 20, 1939 |
| 2,204,988 | Haltenberger | June 18, 1940 |
| 2,263,107 | Smirl | Nov. 18, 1941 |
| 2,655,935 | Kinzbach | Oct. 20, 1953 |
| 2,818,249 | Boschi | Dec. 31, 1957 |
| 2,854,995 | Lornitzo | Oct. 7, 1958 |
| 2,906,289 | Fox | Sept. 29, 1959 |

FOREIGN PATENTS

| 827,144 | Germany | Jan. 7, 1952 |
| 951,195 | Germany | Oct. 25, 1956 |